United States Patent [19]

Chow et al.

[11] 4,335,400

[45] Jun. 15, 1982

[54] ADAPTIVE POST-FILTER FOR INFRARED SCAN CONVERTER

[75] Inventors: Sen-Te Chow, Alexandria; Tsan H. Lin, Vienna, both of Va.

[73] Assignee: The United States of America as represented by the Secretary of the Army, Washington, D.C.

[21] Appl. No.: 199,419

[22] Filed: Oct. 22, 1980

[51] Int. Cl.³ ..................... H04N 5/14; H04N 5/21; H04N 5/33

[52] U.S. Cl. ................................. 358/113; 358/166; 358/167

[58] Field of Search ................. 358/113, 160, 166, 87, 358/37, 36, 167, 105, 135, 140; 250/330, 332, 333, 334

[56] References Cited

U.S. PATENT DOCUMENTS 4,090,221 5/1978 Connor .............................. 358/166
4,125,862 11/1978 Catano ................................ 358/87

Primary Examiner—Joseph A. Orsino, Jr.
Attorney, Agent, or Firm—Nathan Edelberg; Milton W. Lee; John E. Holford

[57] ABSTRACT

A special detector and post-filtering system is provided for a scan converter which processes a TV type video signal from one or more infrared detectors which are vertically sampled at a rate less than the Nyquist rate required for the bandwidth of the detectors.

2 Claims, 7 Drawing Figures

BANDWIDTH OF THE POST-FILTER IS WIDENED FOR THE BEST VERTICAL RESOLUTION

BANDWIDTH OF THE POST FILTER IS NARROWED TO REDUCE SIGNAL ALIASING

ADAPTIVE POST-FILTER FOR INFRARED SCAN CONVERTER

The invention described herein may be manufactured, used, and licensed by the U.S. Government for governmental purposes without the payment of any royalties thereon.

BACKGROUND OF THE INVENTION

1. Field of the Invention.

The invention applies to infrared detection systems and the like wherein information from one or more individual pixel detectors is sampled in time and processed into a TV type video signal.

2. Description of the Prior Art.

Due to its high sensitivity, efficiency and predictable resolution, the individual photodiode has become the preferred detection element for the retinas of infrared detection systems. Good detectors of this type were originally so difficult to fabricate and expensive that early systems used only one detector over which a two dimensional infrared image was scanned in two coordinates such as the well known "x" and "y" directions. As the technology improved it became possible to form line arrays of these detectors at reasonable costs, which need be scanned in only one direction. Such systems are now state of the art and usually consist of a vertical line array over which an image is scanned horizontally by a vibrating mirror. Two dimensional arrays are also feasible which require no scanning and hence called "staring" arrays.

The bandwidth or resolving power of these arrays is directly related to the number of detectors in the array and the response time of each detector. Current systems, however, use sampling techniques which stress simplicity and do not utilize the maximum bandwidth available. As the image is scanned horizontally across a vertical line array, the detectors are sampled vertically at a rate considerably less than twice the highest possible frequency in the output signal band to obtain a video signal. This permits an annoying distortion of the detector outputs known as signal aliasing. It results from the fact that certain high frequency components of the video signal are processed as low frequency components and abnormally increase the latters amplitude. If the higher frequencies are filtered out, this problem is reduced, but there is also a noticeable decrease in vertical resolution when the resulting signal is used to produce a visible image. In many situations, however, the aliasing is minimal and is preferable to the loss in the resolution. If the system is to be used in a wide range of applications the designer is thus put on the horns of a dilemma.

BRIEF DESCRIPTION OF THE INVENTION

The present invention proposes to solve this dilemma by means of a novel adaptive post filtering system which automatically detects the video signal in each detector channel and only post filters those channels which contain objectionable aliasing signals.

BRIEF DESCRIPTION OF THE DRAWINGS

The invention is best understood with reference to the drawings, wherein.

DESCRIPTION OF THE PREFERRED EMBODIMENT

Figure 1:
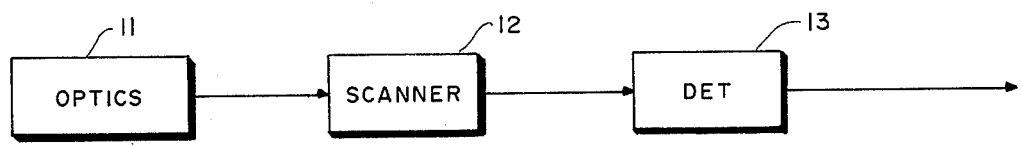
FIG. 1 shows the block diagram of a military type thermal imager.

Referring specifically to FIG. 1, there is shown a block diagram of the most common thermal imager now in military use. It consists of an optics module 11, which may be simply an objective lens; a scanner module 12, essentially a plane IR mirror that vibrates about its center point and about either an x or y axis or both (two mirrors can be used) in the plane of the mirror; and a detector module 13, which consists of one or more detectors sensitive to infrared energy. If one detector is used the mirror or mirrors of the scanner module scan an image over it in both the "x" and "y" coordinates, but more commonly a line array is used and scanned only over the "x" coordinate or horizontally. This latter system provides much better resolution, but no longer provides a serial stream of information in normal video format with which a normal TV type cathode ray tube (CRT) is designed to operate. Interlace is achieved in either system by a slight additional tilt of the "y" mirror axis between fields.

FIGS. 2A-2D show the block diagrams of four Forward Looking Infrared (FLIR) systems now under development for use with the imager in FIG. 1. The direct view (DV) system of 2A uses a multichannel amplifier module 21 which has at least a separate channel for each detector. A LED module 22 is also provided usually containing one LED connected to each detector through a separate amplifier channel. The light generated by the LEDs is then radiated into the scanner module 12 of the imager to be reflected from the back of the IR scanning mirror or mirrors thereby forming a two dimensional visible light image. The image is usually small and faint so that an Image Intensifier ($I^2$) module 23 is added to brighten and enlarge it. This module contains an image intensifier tube and magnifying lenses to provide suitable eye relief for one or more observers.

Figure 2A:
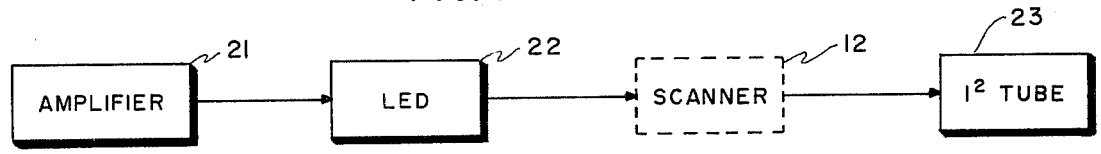
FIGS. 2A-2D show block diagrams of several configureations of a Forward Looking Infrared (FLIR) detection system currently in military use with the imager of FIG. 1.
Figure 2B:
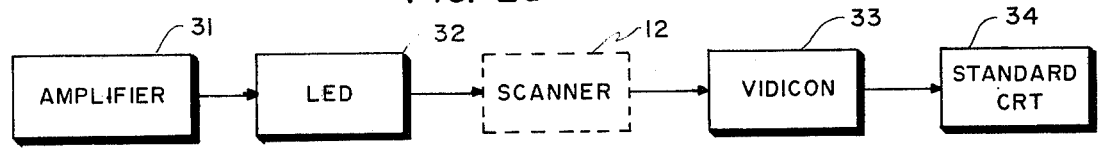

FIG. 2B shows the block diagram for an electroptical multiplexing system. This system operates the same as the DV system through modules 31, 32 and 12 to provide an IR image. This image is then processed by a vidicon module 33 which contains an objective lens to focus the image on the face of an IR vidicon tube, the vidicon tube and circuitry to produce a video signal, and in some cases additional circuitry to modulate a high frequency carrier with that signal and transmit it. A standard CRT module 34 such as a TV receiver is then used to produce a visible image.

Figure 2C:
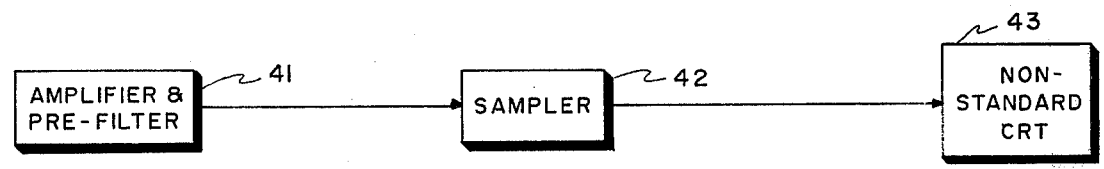

FIG. 2C shows an electronic multiplexing system. An amplifier module 41 as in the previously discussed systems is used but it also contains a prefilter with a low-pass characteristic and a sharp cutoff frequency. The parallel channels are then fed into a sampler module which contains a multiplexer to scan the channel outputs continuously thereby providing a serial output signal. Unlike the system of 2B this system provides an output signal that is a nonstandard vertically scanned video signal and a non-standard CRT module must be provided based on the mirror and multiplexer scan rates.

Figure 2D:
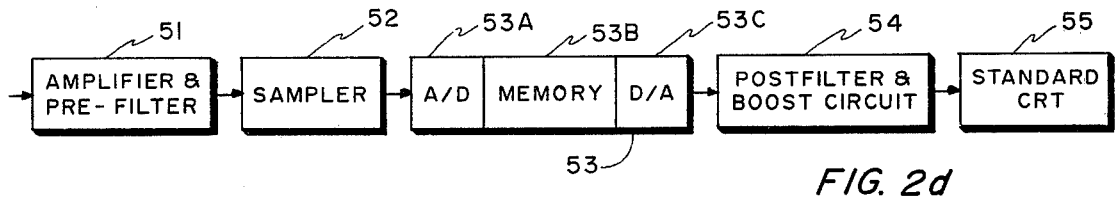

FIG. 2D shows a system which uses a digital scan converter. The amplifier 51 and sampler 52 operate as in the system of FIG. 2C, but the nonstandard video signal is fed into a digital scan converter (DSC) module 53. The DSC module contains at least three submodules, an A/D converter 53A, a memory 53B and a D/A 53C. The memory has sufficient capacity to store at least one frame or two consecutive fields. As one field is read in using a fast vertical slow horizontal scan the other is written out in fast horizontal slow vertical format. A postfilter and boost module 54 is provided with means to eliminate signal aliasing which may, for example, be a low-pass filter. Boost circuits are also provided for amplifying the signal to the levels required for a horizontally scanned standard CRT module. While the signal is in digital form additional processing of the signal can be achieved. Instead of just two field memories any number can be used and coupled with appropriate logic to permit TV compatibility, image enhancement, frame freeze, zoom focusing and many other standard TV techniques.

Signal aliasing is avoided in the systems of FIGS. 2A and 2B, at the expense of vertical resolution by making the height of each LED twice that of the corresponding detector. In the system of FIG. 2C postfiltering is usually accomplished by enlarging the display dot size to produce an equivalent result. This can also be done in the FIG. 2D system. There are times, however, when aliasing is minimal and easily tolerated to get improved vertical resolution.

Figure 3:
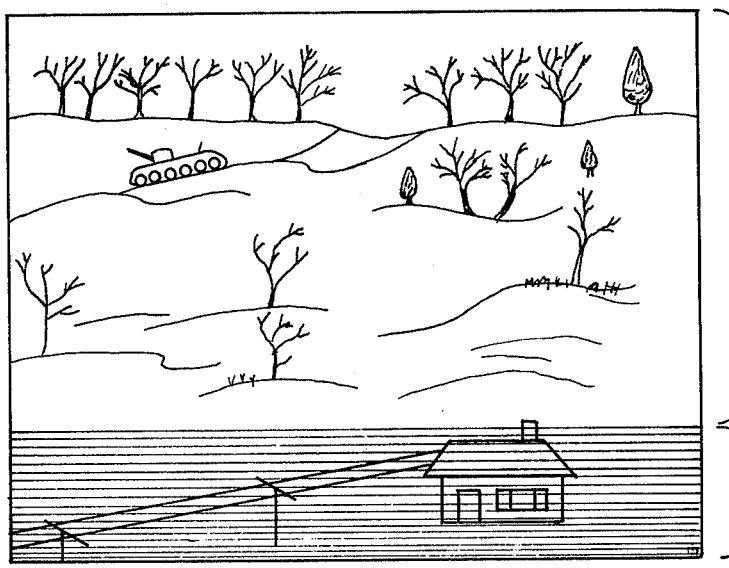
FIG. 3 shows a typical image wherein signal aliasing is likely to occur.

FIG. 3 shows a scene which illustrates both maximum and minimum aliasing conditions. The slender power lines which make a small angle to the scan direction are extremely suceptible to aliasing. The roof of the house also presents strong aliasing. The tank might provide aliasing depending on its thermal signature. Close targets like those at the bottom of the scene tend to be more objectionable to an observer than distant objects as in the upper portion of the scene. Horizontal edges of targets are most affected by aliasing particularly if the target is moving. Slender targets in general are troublesome when oriented at a small angle to the scan direction because of the strong high frequency components in their spectrum. Periodic targets of this type are particularly troublesome, but fortunately they are rare and, therefore, are not dealt with in the present invention. Postfiltering can reduce aliasing, but it also greatly reduces vertical resolution. In tactical applications where the target information is essential, and cosmetically pleasing imagery is secondary, vertical resolution should be maximized and minor aliasing can be tolerated.

Figure 4:
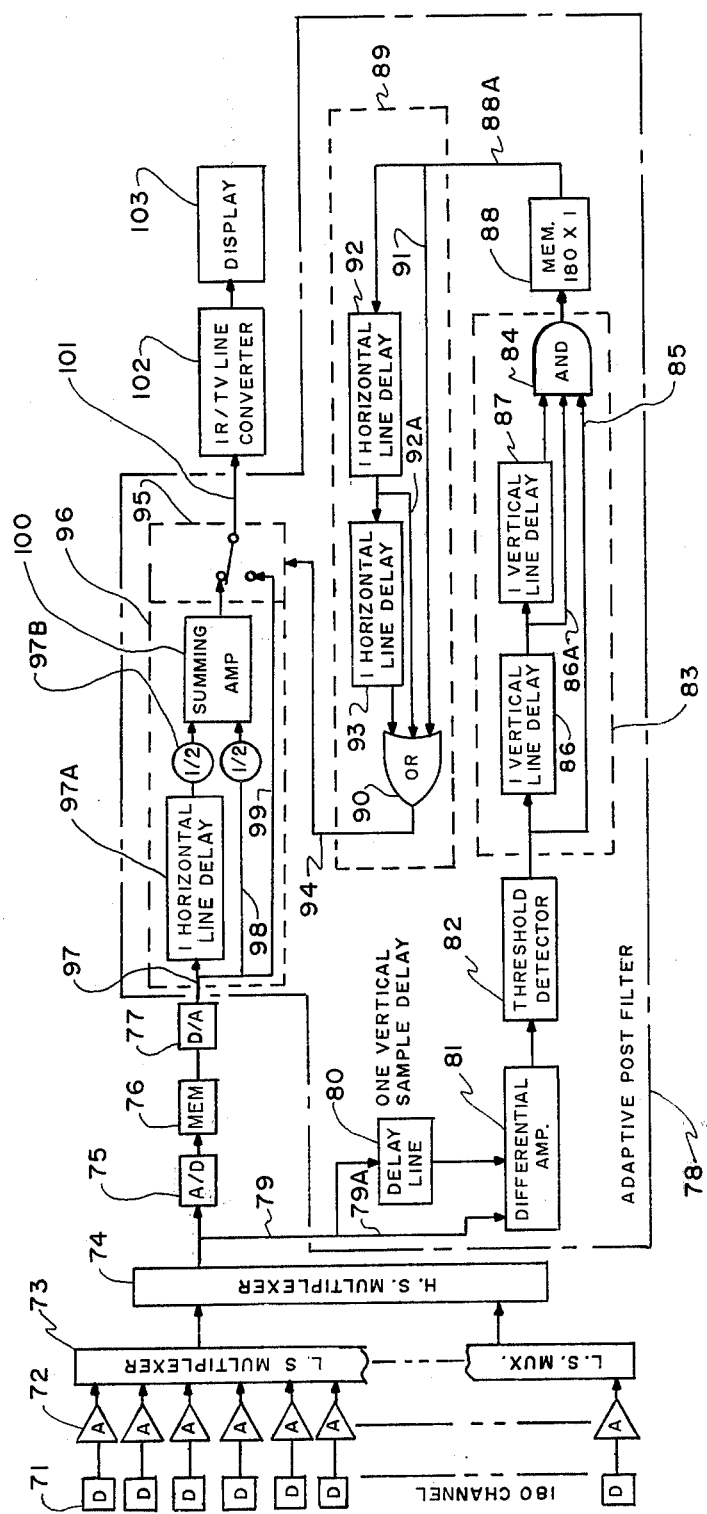
FIG. 4 shows the system of FIG. 1D modified with an adaptive post filter circuit according to the present invention.

FIG. 4 shows a FLIR system with an adaptive postfiltering arrangement according to the present invention. In the current FLIR system the detectors are divided into smaller groups of detectors 71 which after being amplified in separate channels 72 are combined by a first low speed multiplexer (MUX) 73. The output of these multiplexers feeds the different inputs of a second high-speed multiplexer 74 which scans all the groups of channels in the time period that the first multiplexer lingers on one detector. Thus in one scan of the first multiplexers the second multiplexer supplies an output sample from every detector channel. The couplings from each detector to the low speed multiplexer are arranged so that they are sampled in the same order as they appear in the array. These samples are prefiltered and accumulated between scans in the various channels and converted from analog to digital signals by means of the converter 75 as in FIG. 2D and then stored in the memory 76. The memory stores the samples in one format as each field is vertically scanned and reads them out in standard TV format (horizontal scan) to the digital to analog converter 77 during the next field period.

The shorter time required to generate serial horizontal lines is the basis for the horizontal time delays in FIG. 4, while the time required for the multiplexers 73 and 74 to scan all detectors is the basis for the vertical line delays.

At this point in the present invention, the serial stream of horizontal image lines enters the adaptive postfilter circuit 78. To energize the decision circuitry, as separate input lead 79 is provided for the serial stream of vertical lines emerging from the high speed multiplexer. Signal aliasing is strongly correlated with changes in intensity between the successive samples or pixels which appear in lead 79. To detect this change each pixel's signal amplitude is compared with a previous pixel signal which passes through delay line 80 to experience a one pixel time delay. The two signals energize separate inputs of a differential amplifier 81. The output of that amplifier is fed through a threshold detector 82 which provides an output pulse only when the difference in its input signals is more than a preset adjustable level which reduces aliasing to an acceptable level.

The output of the threshold detector is connected to the input of the Point Source False Alarm Eliminator circuit 83. This circuit contains an AND gate 84 with three inputs. This gate generates an output pulse, no wider than a pixel, only when a direct pulse and pulses due to two previous pixels are emitted by the threshold detector. The pulses arrive at their respective inputs after traversing direct lead 85 and delay lines 86 and 87, each delay line providing a delay equal to the time to generate one vertical line at the output of multiplexer 73. The output of the AND gate feeds the input of memory circuit 88 having one memory element for each line of one field (180×1). This memory shares the same clock (not shown) that also synchronizes memory 76 and the multiplexers 73 and 74, so that the input of each of its memory elements is connected to gate 84 for a different horizontal image line and will change during that line only if there is an output pulse from gate 84. The memory elements are preferably read out at the beginning of the image line prior to the corresponding image line in the next field.

The output from memory circuit 88 feeds an Adjacent Line Enable Extender circuit 89. Phase differences between the signal main lobe and side lobes of the FLIR device may cause aliasing to occur in adjacent image lines to the one selected by the threshold detector 82, which aliasing may go undetected. To avoid this, the signal to Extender circuit 89 is preferably split into three paths which feed the inputs or OR gate 90. The first path 91 is direct and represents video information for an image line prior to that which has excited the threshold detector, the latter having been advanced by early readout from the memory circuit 88. The second path is through delay line 92 and bypass lead 92A and represents an image line which has excited the threshold detector, since the memory signal is delayed by delay line 92 for one horizontal line period of the signal in path 97. The third path, which traverses two identical delay lines 92 and 93, represents the image line following the threshold detected line. The OR gate thus produces an output filter control pulse in lead 94 at the beginning of each of these three image line periods all delayed by one field period by means of the combined delay of memory circuit 88 and lines 92 and 93.

The control pulses actuate switch module 95 and are correlated with the serial stream of horizontal line information signals arriving at the postfilter module 96 through line 97. These signals have usually been delayed one field by memory 76. If the serial image line information is serially processed through a number "n" of memories, like memory 76, the memory 88 can be expanded to a 180×n unit to maintain correlation of the postfilter switching control pulses. It will be obvious to those skilled in the art that by reading out the memory 88 "m" line periods earlier and providing "2m" line delays in series with bypass leads from each delay juncture to the OR gate inputs, the extender circuit can cause any odd number of horizontal image lines to be postfiltered, the lines being centered around every line that actuates the threshold detector. Thus a relatively low percentage of very objectionable signal aliasing can be translated into an instruction that can cause postfiltering of an entire field.

The postfilter module 96 can take on a variety of forms such as various pi or T filters but the preferred form is an active filter consisting of a summing amplifier 100 with two or more inputs. One input is fed directly from lead 97 through lead 98. A second input is fed through a delay line 97A which provides a delay equal to one horizontal line period. Weighting attenuators or amplifiers 97B may be inserted in one or both input lines to produce a net weight of one half to the signals in each line so that the net input of the amplifier is the average of signals in both lines. This type of averaging can be extended to three or more lines to further reduce the effect of aliasing, but the designer must be prepared to surrender the additional loss in vertical resolution. The postfilter module also provides a direct lead 99 with no filter action. The switch module contains an output line 101 which is normally connected to the lead 99 through a single pole double throw voltage controlled solid state switch. When an output pulse is received from lead 94 the switch disconnects line 101 from line 99 and connects it to the output of amplifier 100 for one horizontal line period. This is best achieved by having a one shot multivibrator (not shown) in switch module 95 to reshape the control input pulse, in a standard manner well known in the art, but can also be accomplished by a similar technique applied to the output of memory 88. The signal on lead 101 can be further processed by circuits like converter 102 to change the 360 interlaced line image to a 525 line TV format with suitable synchronizing and blanking pulses for use with a TV receiver or similar display unit 103.

Many variations of the above methods and circuitry will be obvious to those skilled in the art, but the invention is limited only as defined in the claims that follow.

We claim:

1. In a FLIR system having a vertical line array of detectors over which an IR image is scanned over horizontally each field period with a multiplexer coupled to and sampling said detectors sequentially and periodically many times over each said field period to generate pixels at a multiplexer output terminal and having a digital-scan-converter coupled to said multiplexer output terminal which stores said pixels for an integral number of field periods and regenerates them at a converter output terminal at the same field rate but in a sequential horizontal line format; an adaptive postfilter circuit comprising:

a pulse actuated solid state single pole double throw terminal switch with a first normally open and a second normally closed throw terminal, a control terminal responsive to an input control pulse to reverse the state of said throw terminals for one sequential horizontal line period, said single pole being the postfilter output terminal, and said normally closed throw terminal being directly connected to said converter output terminal;

a low pass filter connected between said converter output terminal and said first normally open throw terminal;

a threshold detector means having an input terminal coupled to said multiplex output terminal to generate a control pulse at a threshold output terminal when the difference in the level of two successive pixels in time exceeds a preselected level; and a field delay means connected between said threshold output and said control terminal to delay said control pulse at least until the beginning of a subsequent field period.

2. A post filter according to claim 1 wherein:
   said digital scan converter delays said pixels "n" periods (where n is any integer)
   said field delay means delays said control pulses until the beginning of the "nth" subsequent field minus "m" sequential horizontal line periods; and
   a line extender circuit means is connected between said field delay means and said control terminal to generate an additional "2m" extension pulses following said control pulse each pulse coinciding with the start of a different consecutive horizontal line generated by said digital scan converter.

* * * * *